Jan. 27, 1970    TOSHIMASA FUJIWARA ET AL    3,492,516
ROTOR WITH COILS OF THE OUTER ROTOR TYPE MOTOR
Filed Aug. 1, 1967                              4 Sheets-Sheet 1
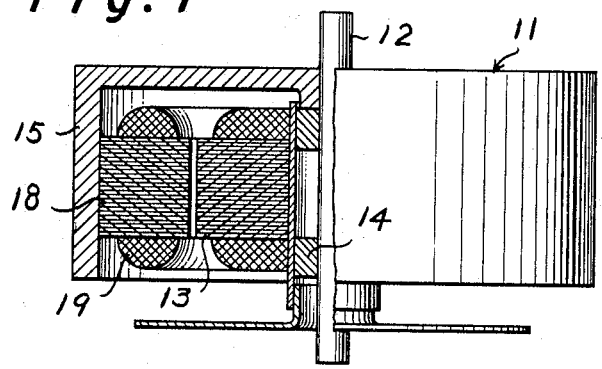
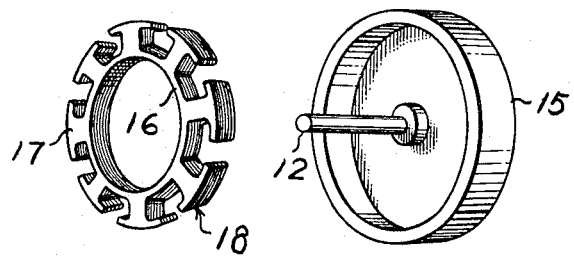
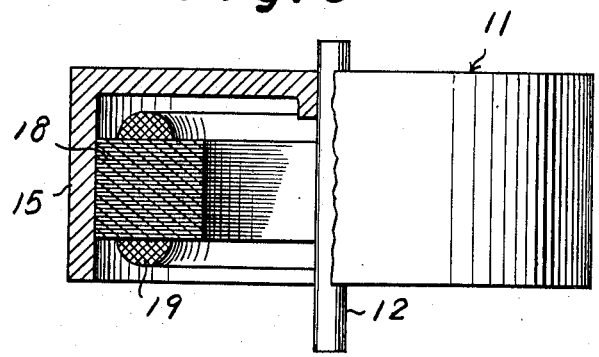
INVENTORS
TOSHIMASA FUJIWARA,
KENICHI KITAMURA
BY Stevens, Davis, Miller & Mosher
ATTORNEYS Jan. 27, 1970 TOSHIMASA FUJIWARA ET AL 3,492,516
ROTOR WITH COILS OF THE OUTER ROTOR TYPE MOTOR
Filed Aug. 1, 1967 4 Sheets-Sheet 4
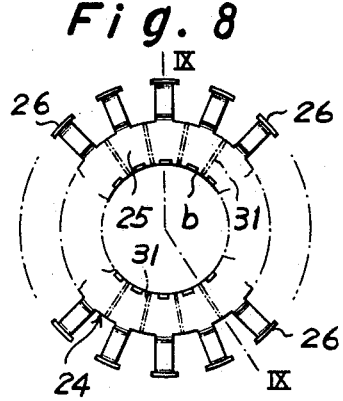
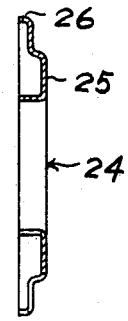
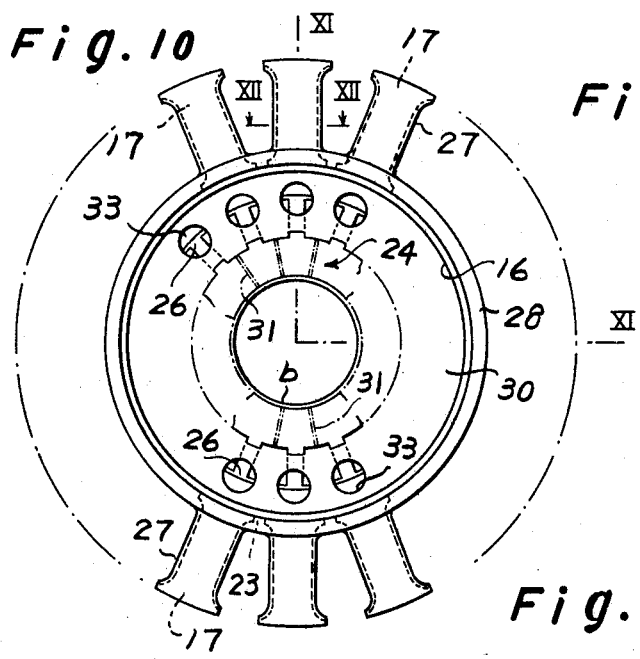
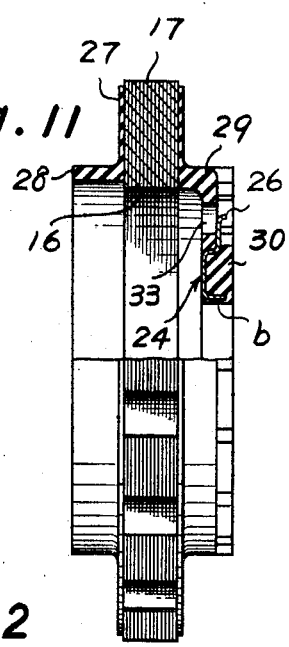
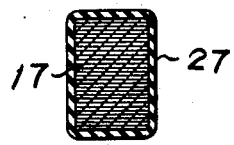
INVENTORS
TOSHIMASA FUJIWARA,
KENICHI KITAMURA,
BY *Stevens, Davis, Miller & Mosher*
ATTORNEYS

United States Patent Office 3,492,516
Patented Jan. 27, 1970

1

3,492,516
ROTOR WITH COILS OF THE OUTER ROTOR TYPE MOTOR
Toshimasa Fujiwara and Kenichi Kitamura, Yokohama, Japan, assignors to Victor Company of Japan, Limited, Yokohama, Japan
Filed Aug. 1, 1967, Ser. No. 657,684
Claims priority, application Japan, Aug. 4, 1966, 41/73,360; Nov. 1, 1966, 41/71,687; Dec. 31, 1966, 41/86,010 (all utility models)
Int. Cl. H02k *17/18, 17/22*
U.S. Cl. 310—67
2 Claims

ABSTRACT OF THE DISCLOSURE

A rotor with coils of the outer rotor type motor and a method of manufacturing same comprising a rotor iron core including a plurality of magnetic poles, coils mounted in each of said magnetic poles of said rotor iron core, and a cylindrical yoke having a rotor shaft firmly secured to the center part thereof into which said rotor iron core mounting said coils is fitted firmly.

Each of said magnetic poles has a flange formed on the outer circumferential edge thereof, which has a width greater than the width of each magnetic pole, while magnetic gaps are formed each between the inner ends of the adjacent magnetic poles. An insulation material is injected into each magnetic pole to form a coat of insulation material thereon by molding. Cylindrical coil retaining members and a commutator retaining member are also formed integral with said coat of insulation material by molding, and a commutator is attached integrally to said commutator retaining member.

---

This invention relates to a rotor with coils of the outer rotor type motor, and in particular the invention relates to a construction of said rotor and a method of manufacturing same.

In forming coils on a plurality of magnetic poles projecting radially of the iron core of the rotor of this type, it has hitherto been customary to form coils on separate winding frames and insert them into the magnetic poles. This process has presented a difficulty in obtaining uniformly arranged coils, with coils often tending to be displaced radially of the rotor iron core. Another disadvantage of this process has been that there is an increased dynamic unbalance centering around the rotor shaft. Moreover, there are complicated operational processes involved in assembling a rotor.

In another method known in the art of rotors of this type, magnetic poles are attached to the inner side of a cylindrical yoke and coils are mounted on said magnetic poles later on. There are also complicated operational steps involved in mounting coils. In addition, it is quite difficult to arrange the magnetic poles in such a manner that the inner ends thereof are disposed completely on the locus of a circle. This has resulted in gaps between the stator and the magnetic poles being irregular and not uniform in shape.

The present invention obviates all the disadvantages set forth hereinabove.

Accordingly, the principal object of this invention is to provide a rotor with coils of the outer rotor type motor which is simple in coil mounting operational processes, easy to assemble, and naturally adapted for a mass production.

Another object of the invention is to provide a rotor with coils of the outer rotor type motor and a method of manufacturing same, which exhibits high performance because of the fact that a decrease in the density of magnetic flux can be prevented.

2

Still another object of the invention is to provide a rotor with coils of the outer rotor type motor and a method of manufacturing same, in which a coat of insulating material and a commutator are formed integrally with the rotor iron core.

Other objects and features of the invention will become apparent from the description set forth hereunder when considered in conjunction with the accompanying drawings, in which:

FIG. 1 is a fragmentary longitudinal sectional side view of one embodiment of an outer rotor motor of the direct current shunt type;

FIG. 2 is a perspective view of a rotor iron core in which coils of the rotor are mounted according to the present invention and a yoke before being fitted one into the other;

FIG. 3 is a fragmentary longitudinal sectional side view of an iron core mounting coils and a yoke fitted one into the other;

Figure 5:
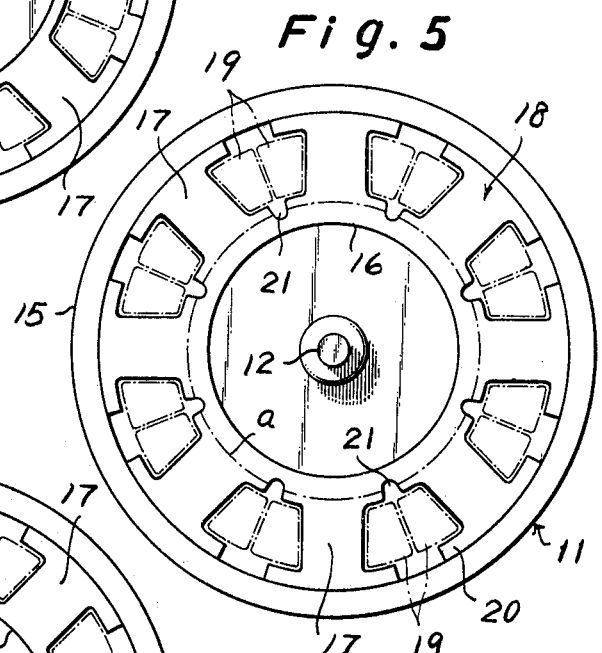
Figure 6:
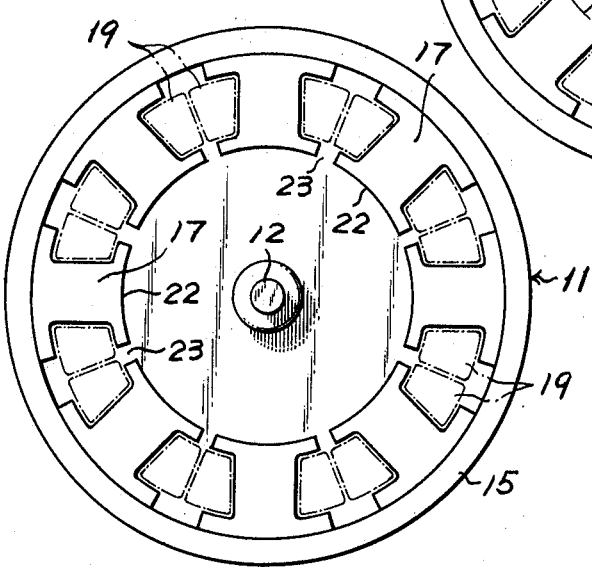
Figure 7:
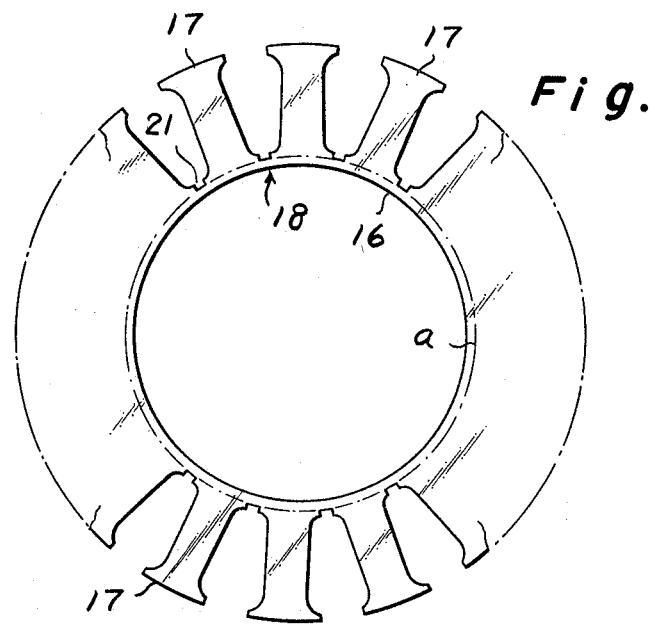

FIG. 5 and FIG. 6 show a second embodiment, FIG. 5 being a view before completion and FIG. 6 being a view after completion; and FIGS. 7 to 13 show a third embodiment, FIG. 7 being a plan view of a rotar iron core, FIG. 8 being a plan view of a commutator, FIG. 9 being a view in section taken along the line IX—IX of FIG. 8, FIG. 10 being a plan view showing a coat of insulating material and a commutator formed integrally with a rotor iron core, FIG. 11 being a sectional side view on the line XI—XI of FIG. 10; FIG. 12 being a view in section taken along the line XII—XII of FIG. 10, and FIG. 13 being a plan view showing the manner in which an iron core shown in FIG. 10 with coils mounted thereon is fitted into a cylindrical yoke.

In the drawings, like reference characters designate similar parts in several drawings showing various embodiments of the invention.

With reference to FIG. 1, an outer rotor is generally shown at 11. A rotor shaft 12 is fixed to the center part of said rotor 11 and rotatably supported by a bearing 14 arranged in the center of a stator 13.

As shown in FIGS. 2 and 3, said outer rotor 11 comprises a yoke 15 formed in the shape of a cylinder as by sentering a magnetic alloy, a rotor iron core 18 formed as a rotor laminate consisting of several layers superimposed and adhered together, such layers being formed of a magnetic material as by pressing to provide an annular inner edge portion 16 and a plurality of magnetic poles 17 radially projecting therefrom, and coils 19 each of which is mounted on one of said magnetic poles of the rotor iron core. The rotor iron core 18 mounting the coils 19 is fitted into the cylindrical yoke 15 to be fixed therein.

Figure 4:
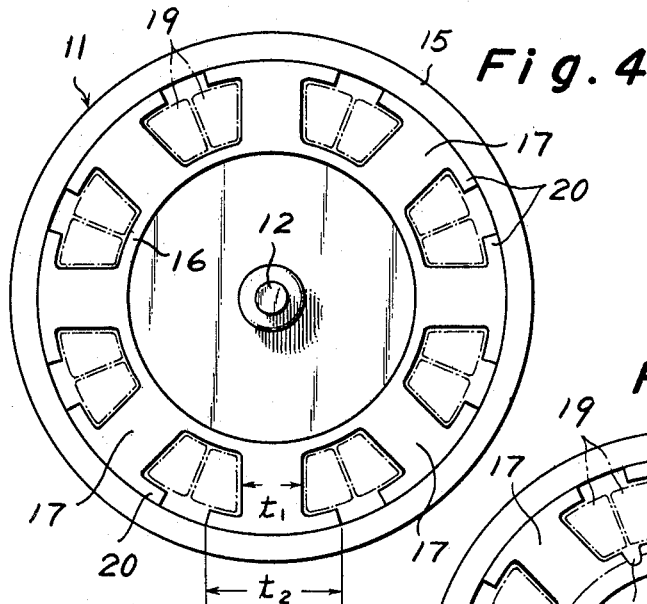
FIG. 4 is a plan view of one embodiment of the rotor according to this invention.

FIG. 4 shows one embodiment of the rotor according to this invention. The rotor iron core 18 as shown comprises an annular inner edge portion 16 and a plurality of magnetic poles 17 radically projecting therefrom, each of which is formed to provide a flange 20 at its outer end, It is to be noted that the width $t_2$ of said flange is substantially larger than the width $t_1$ of the magnetic pole 17, and that the gap between the adjacent flanges is substantially larger than the width $t_1$ of the magnetic turns of a coil. Thus, the coil 19 can be formed by passing a wire through the gap between the flanges 20 by means of a conventional coil winding machine. The rotor iron core 18 mounting the coils 19 wound in this way is fitted into the cylindrical yoke to be fixed therein so that they may be arranged integrally to provide a rotor as a finished product. The provision of flanges 20 prevents coils 19 from bulging out of the rotor iron core in the radial direction when they are being wound, thereby facilitating the coil winding operation. The provision of flanges also increases the area of contact between the rotor iron core and the yoke as they are fitted one into the other and reduces magnetic resistance therebetween, thereby preventing a decrease in the density of magnetism.

FIGS. 5 and 6 show a second embodiment of the invention. The rotor iron core 18 as shown comprises an annular inner edge portion 16 and a plurality of magnetic poles 17 radically projecting therefrom as the embodiment shown in FIG. 4, but openings 21 are formed in the annular inner edge portion 16 each between the adjacent magnetic poles 17. The rotor iron core 18 is mounted with coils 19 in the same way as described with the first embodiment, and then fitted into the cylindrical yoke 15, with the magnetic poles 17 being secured to the yoke 15 by means of an adhesive, a weld, or a bolt threaded from outside the yoke 15 into a hole formed in each magnetic pole. Then, the annular inner edge portion 16 of the rotor iron core 18 is cut off as far as a dot-and-dash line a or openings 21 as by a milling machine to provide gaps 23 each between the inner ends 22 of the adjacent magnetic poles 17. In this way, a rotor as shown in FIG. 6 can be obtained. In manufacturing this embodiment of the invention, coil winding operation is very simple. Moreover, it is quite easy to arrange the inner ends of the magnetic poles 17 on the locus of a circle, so that the gaps between the stator 13 and the magnetic poles 17 can be made uniform. It is to be noted that the invention makes it possible to minimize these gaps and yet to prevent the occurrence of contact between the magnetic poles 17 and the stator 13, thereby contributing to increased performance of the motor.

FIGS. 7 through 13 inclusive show a third embodiment of the invention. FIG. 7 shows a rotor iron core which is similar to the rotor iron cores of the first and second embodiments except for the fact that they differ from one another in the number of magnetic poles. A detailed explanation of this rotor iron core shall be omitted.

FIGS. 8 and 9 show a commutator 24 which is formed of a copper plate or the like as by pressing to provide an annular inner edge portion 25 and coil end attaching members 26 identical in number with the magnetic poles of the rotor iron core 18.

The rotor iron core 18 shown in FIGS. 10, 11 and 12 and comprising an annular inner edge portion 16 and a plurality of magnetic poles radially projecting therefrom has a coat of insulating material 27 applied thereto by injecting an insulating material, such as resin or the like, and formed by molding. The iron core 18 also has cylindrical coil retaining members 28 and 29 formed integrally with said coat of insulating material on the upper surface and underside of the annular inner edge portion 16 by molding. In addition, the iron core 18 also has a commutator retaining member 30 formed integrally therewith, said commutator retaining member 30 being formed by inwardly bending and forming an extension of one cylindrical coil retaining member 29 when said insulating material is injected for forming said members by molding. The commutator 24 is attached to said commutator retaining member 30 to provide an integral unit, with certain parts of the former being embedded in the latter. In injecting said insulating material and molding said members, care should be exercised not to form a coat of the insulating material on the outer circumferential surface of each of the magnetic poles 17.

Figure 13:
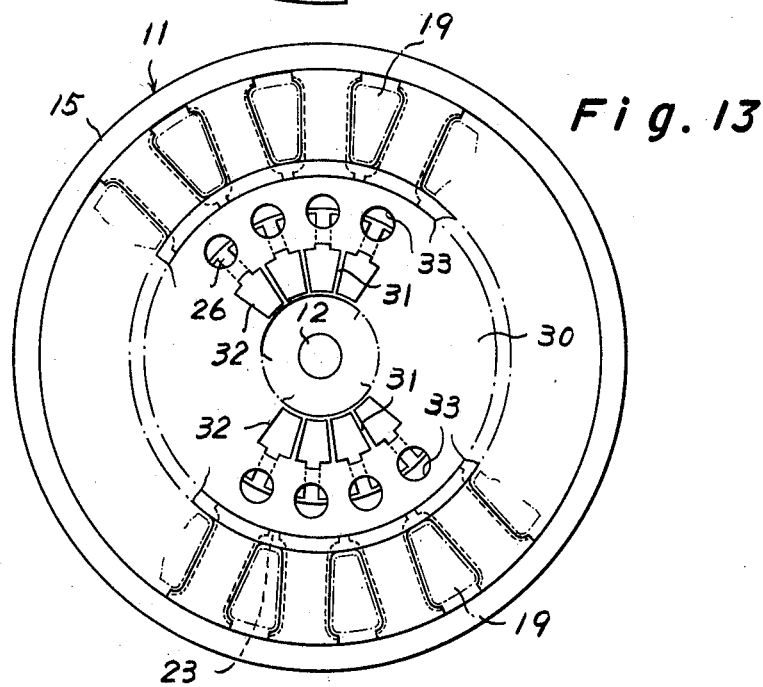

After the commutator 24 has been attached integrally to the commutator retaining member 30 by molding, radial slits 31 identical in number with the magnetic poles 17 are formed in the annular inner edge portion 25 of the commutator 24 each between the coil end attaching members 26. Then, an inner peripheral edge portion b is cut off to provide commutator members 32 as shown in FIG. 13. There are also provided openings 33 formed integrally with the commutator retaining member 30, which may be used when a coil end is attached to each of the coil end attaching members 26 disposed in any position as desired or may serve as ventilating means. After coils 19 are mounted in the magnetic poles 17 of the rotor iron core 18 formed as aforementioned, said rotor iron core 18 is fitted into and fixed to the cylindrical yoke 15 having a rotor shaft 12 fixed thereto. Then, said annular inner edge portion 16 is cut off as far as the line a as shown in FIG. 7 to provide magnetic gaps 23 each between the inner ends of the adjacent magnetic poles 17. In cutting off the annular inner portion 16, chips are prevented from working their way into said magnetic gaps 23 because the openings 21 between the magnetic poles 17 are filled with the insulating material. The provision of the coat of insulating material 27 on the rotor iron core 18 ensures that perfect insulation can be provided between the rotor iron core 18 and the coils 19.

While the invention has been described with reference to its several preferred embodiments, it is to be understood that the invention is not limited thereto, and that changes may be made therein without departing from the scope of the invention which is defined in the appended claims.

What we claim is:

1. A rotor with coils of the outer rotor type motor comprising a rotor iron core including an annular inner edge portion, a plurality of magnetic poles radially projecting from said annular inner edge portion, and a coat of insulating material formed on said magnetic poles by injecting and forming by molding an insulating material; cylindrical coil retaining members formed integrally with said coat of insulating material on the upper surface and the underside of said annular inner edge portion of said rotor iron core; a commutator retaining member formed by inwardly bending and forming an extension of one of said cylindrical coil retaining members; a commutator attached integrally to said commutator retaining member; coils each mounted on one of said magnetic poles of said rotor iron core; and a cylindrical yoke having a rotor shaft fixed to the center thereof in which is fitted and fixed said rotor iron core mounting the coils.

2. A rotor with coils of the outer rotor type motor as claimed in claim 1 in which said magnetic poles are formed to provide flanges each at the peripheral edge of one of the magnetic poles and magnetic gaps each formed between the inner ends of the adjacent magnetic poles, said flanges having a width greater than the width of the magnetic poles.

References Cited

UNITED STATES PATENTS

| 1,219,564 | 3/1917 | Kouyoumjian | 310—237 |
| 2,756,354 | 7/1956 | Baron | 310—235 |
| 3,027,471 | 3/1962 | Burgwin | 310—67 |
| 3,179,825 | 4/1965 | Terry | 310—67 |
| 2,528,154 | 10/1950 | Ludwig | 29—598 |
| 2,763,916 | 9/1956 | Korski | 29—598 |
| 3,349,478 | 10/1967 | De Jean | 29—598 |

J D MILLER, Primary Examiner

R. SKUDY, Assistant Examiner

U.S. Cl. X.R.

310—233